United States Patent [19]

Rautenberg

[11] Patent Number: 4,972,522

[45] Date of Patent: Nov. 27, 1990

[54] GARMENT INCLUDING ELASTIC FABRIC HAVING A GROOVED OUTER SURFACE

[76] Inventor: Leonard J. Rautenberg, West Creek Farms Rd., Sands Point, N.Y. 11050

[21] Appl. No.: 459,189

[22] Filed: Dec. 29, 1989

Related U.S. Application Data

[62] Division of Ser. No. 213,934, Jun. 30, 1988.

[51] Int. Cl.$^5$ .............................................. A41D 7/00
[52] U.S. Cl. ........................................................ 2/67
[58] Field of Search ............... 2/67, 68, 243 A, 243 R; 26/96; 156/164, 209, 163

[56] References Cited

U.S. PATENT DOCUMENTS

| | | | |
|---|---|---|---|
| 1,770,615 | 7/1930 | Herlich | 2/67 |
| 2,220,277 | 11/1940 | Ralston | 2/67 |
| 2,374,506 | 4/1945 | Schorovsky | 2/67 |
| 2,434,111 | 1/1948 | Hawley | 26/96 |
| 4,343,044 | 8/1982 | Borda | 2/67 |
| 4,606,964 | 8/1986 | Wideman | 2/67 |

FOREIGN PATENT DOCUMENTS

| | | | |
|---|---|---|---|
| 1032394 | 7/1953 | France | 2/67 |
| 1101086 | 9/1955 | France | 2/67 |
| 1242588 | 2/1959 | France | 2/67 |

*Primary Examiner*—Werner H. Schroeder
*Assistant Examiner*—Diana L. Biefeld
*Attorney, Agent, or Firm*—Darby & Darby

[57] ABSTRACT

A garment, such as a swimsuit, made from a laminated elastic fabric having reduced drag with respect to a surrounding fluid as a wearer of the garment moves through the surrounding fluid. The fabric has a stretch fabric layer and an elastic, plastic layer bonded to the stretch layer to form a laminate, and has a plurality of parallel, spaced grooves disposed in an outer surface of the plastic layer. The garment has its grooves substantially aligned with the direction of movement of fluid over a portion of the garment as the wearer of the garment moves through the fluid.

20 Claims, 1 Drawing Sheet

GARMENT INCLUDING ELASTIC FABRIC HAVING A GROOVED OUTER SURFACE

BACKGROUND OF THE PRESENT INVENTION

1. Field of the Invention

The present invention relates to speed and turbulence-related improvements in elastic fabrics for making athletic costumes and uniforms and to the athletic costumes and uniforms made from such fabric having improved fluid dynamic properties.

2. Background Prior Art

Efforts to reduce drag and turbulence and thereby increase speed of a body passing through a fluid have been of great interest in recent times. The National Aeronautic and Space Administration (NASA) has investigated the use of fine grooves in the surface of a vehicle to lessen the effect of fluid drag and turbulence wherein the fine lines or "riblets" are generally aligned with the direction of fluid flow past the moving body. These investigations were made on aircraft by NASA (Research and Development, Mar. 1984).

The NASA "riblet" principle was subsequently applied to the U.S. yacht "Stars and Stripes" during the America's Cup race in 1987. The entire bottom of the "Stars and Stripes" was covered with sections of an adhesive-backed plastic tape developed by Minnesota Mining and Manufacturing Company in cooperation with NASA. The surface of this tape was inscribed with fine grooves only a few thousandths of an inch wide. The tape was applied so that the grooves aligned with the direction of water flowing past the boat. A distinct increase in boat speed of the "Stars and Stripes" was noted over the yachting course (N.Y. Times, Mar. 3, 1987).

Competitive athletes have always attempted to achieve even the slightest of edges during a competitive event. Times even hundredths of a second apart can be the difference between victory and defeat. Since uniforms are necessary for all athletes, any lessening of drag caused by the uniform itself can be very advantageous.

OBJECTS OF THE PRESENT INVENTION

It is an object of the present invention to provide an improved speed and turbulence-related uniform or garment which, when worn, provides reduced drag and, consequently, increased speed of the athlete.

It is a further object of the present invention to provide an improved speed-related uniform having grooves or "riblets" to reduce drag on the athlete when the uniform is worn.

It is still further object of the present invention to provide a method for making a fabric and for making uniforms from such fabric having improved fluid dynamic characteristics by the use of grooves or "riblets" for reducing drag on the athlete when the uniform is worn.

SUMMARY OF THE PRESENT INVENTION

In accordance with the present invention, a laminated elastic fabric for use in making a garment having reduced drag with respect to a surrounding fluid as a wearer of the garment moves through the surrounding fluid comprises a stretch layer and an elastic, plastic layer bonded to said stretch layer. The plastic layer has a plurality of parallel, spaced grooves in an outer surface thereof.

In a particular, preferred embodiment, the plastic layer is a breathable, waterproof thermoplastic film with approximately equally spaced grooves of substantially equal depth.

Also in accordance with the invention, a garment which, when worn, will reduce drag of a surrounding fluid on a wearer of the garment as the wearer moves through a surrounding fluid comprises a portion to be worn on the body so as to be held closely against the body and comparable to a second skin, which portion has a plastic outer surface. The plastic outer surface of the portion has a plurality of parallel, spaced grooves disposed therein. The grooves are substantially aligned with the direction of movement of fluid over said portion.

A method of making an elastic, laminated fabric having a plurality of parallel, spaced grooves in a plastic outer layer and a stretch fabric inner layer in accordance with the invention comprises the steps of arranging first and second driven rollers to operate in the manner of a mangle, the first roller having a plurality of parallel grooves in its surface; heating the first roller to a predetermined temperature; pressing the first roller against the second roller with a predetermined pressure; and feeding an elastic, laminated fabric having a plastic film layer bonded to a stretch fabric layer between the first and second rollers so that the film side of the fabric is exposed to the first roller to enable the groove pattern of the first roller to be embossed into the film.

Another method of making an elastic, laminated fabric having a plurality of parallel, spaced grooves in a plastic outer layer and a stretch fabric inner layer comprises the steps of knitting the stretch fabric with a plurality of parallel, spaced ribs and bonding an elastic, plastic film to the knitted stretch fabric wherein a plurality of parallel, spaced grooves are defined in the film by pressure of the film against the knitted ribs.

A garment in accordance with the invention is made from the fabric made by the above methods with the added step of cutting the garment from the grooved fabric so that the grooves will align with the direction of movement of fluid past portions of the garment when the garment is worn.

For a better understanding of the present invention, reference is made to the following description and accompanying drawings while the scope of the invention will be pointed out in the appended claims.

DESCRIPTION OF THE PREFERRED EMBODIMENTS

The starting point for the present invention is a new elastic, laminated fabric sold by Darlington Fabrics Corp. under the brand name DARLEXX ™ and which is generally described in U.S. patent application, Ser. No. 068,907, entitled "ELASTIC LAMINATED WATER-PROOF MOISTURE-PERMEABLE FABRIC". The laminated DARLEXX ™ fabric is also breathable and waterproof.

This laminated fabric employs a thermoplastic film bonded to a woven or knitted stretch fabric typically made of spandex and nylon. The thermoplastic film may be up to 1.0 mil thick but the preferred thickness is 0.8 mil.

The inventor has found that this new fabric has inherent low-drag qualities when made into a swimsuit with the plastic film on the outside of the garment and the stretch fabric on the inside. By applying grooves or "riblets" in the film, a significant further reduction in drag in a finished swimsuit can be achieved. It has generally been found that drag on the swimsuit is reduced when the grooves are aligned with the movement of the fluid past particular portions of the swimsuit. Thus, the grooves are preferably arranged along the length of the swimsuit in the front of the swimsuit, that is, parallel to the direction of the swimmer when swimming (head-to-toe direction). It has also been found, however, that when the grooves are arranged to form an inverted "V" in back, a still further reduction in drag can be achieved.

Figure 1:
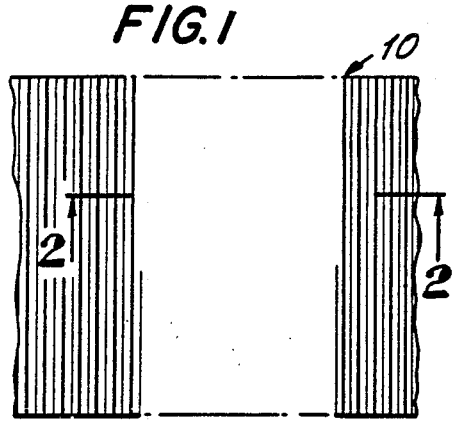
FIG. 1 illustrates the top view of a ribbed fabric for making a garment in accordance with the present invention.
Figure 2:
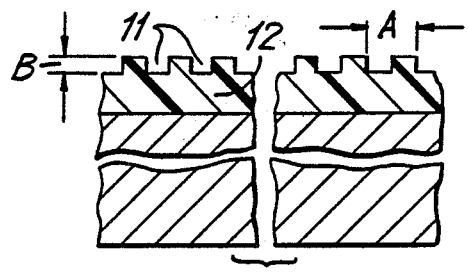
FIG. 2 illustrates a side sectional view of the ribbed fabric of FIG. 1 the section taken along 2—2 of FIG. 1.

Referring to FIGS. 1 and 2, a grooved fabric in accordance with the invention is illustrated. The preferred fabric 10 is the waterproof, elasticized, breathable laminated fabric referred to above and will be so intended by reference to the term "laminated fabric" as used hereafter. Other laminated fabrics having a plastic film layer may be suitable. The inventive principle could also be applied to a non-laminated plastic, elastic material provided the material was sufficiently sturdy and breathable.

In FIGS. 1 and 2, the film layer 12 is shown on the top of the laminated fabric with the woven or knitted layer 13 beneath. Parallel, spaced grooves 11 are present in the film. When equally spaced grooves are used, they are separated by a distance "A", preferably approximately 1/200 inch. The grooves have a substantially uniform depth B, preferably approximately 0.3–0.6 mil deep. An effective range of groove spacing "A" is from 1/175 inch to 1/225 inch. Also effective are groups of closely-spaced grooves where grooves within each group are 1/175 inch to 1/225 inch apart but the groups themselves are separated by about 1/32 to about ⅛ inch.

Figure 3:
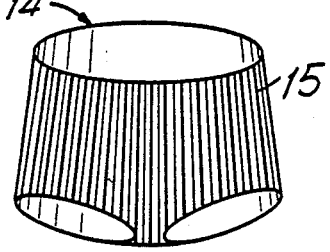
FIGS. 3, 4 and 5 are front, side and rear views respectively of a swimsuit made in accordance with the present invention.
Figure 4:
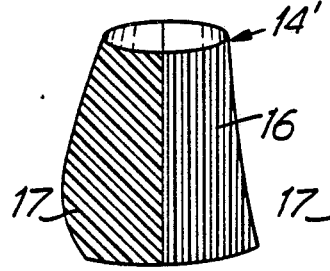
Figure 5:
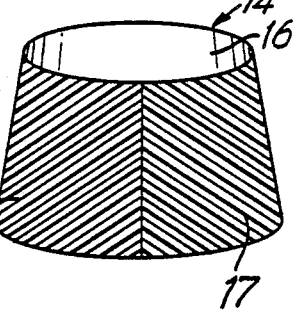

FIGS. 3, 4 and 5 illustrate a man's swimsuit 14 or 14' with the grooves disposed in the plastic film of the laminated fabric. In FIG. 3, the grooves 15 are shown in the head-to-toe direction in the front of the suit. The preferred form of the swimsuit 14' shown in FIGS. 4 and 5 illustrates the swimsuit with the grooves 16 disposed vertically in the front and in an inverted "V" 17 in the back. This arrangement of grooves generally corresponds to the direction of water flowing past the swimsuit when the swimmer is swimming through the water.

The concept of providing grooves or "riblets" to reduce drag and turbulence can readily be applied to any number of athletic uniforms where increased speed and reduced turbulence are important. This principle can apply in any type of fluid (air and water being the most likely). The grooves or "riblets" are generally aligned to correspond with movement of the fluid past particular portions of an atheletic uniform in order to reduce drag and increase speed. In addition to swimsuits mentioned above, athletic uniforms or suits in a variety of sports are encompassed such as skiing, skating, sledding, bicycling, running, triathlon, hang-gliding and skydiving. This list is not considered exhaustive and other sports where increased speed and/or reduced turbulence are desired are within the inventive scope.

It should also be understood that it is not necessary for the athlete's speed to increase to generally improve his or her performance in an event. If there is reduced drag or turbulence, there is also be a corresponding reduction in energy necessary to be expended by the athlete. This is particularly important where a number of heats of a particular event is run.

Figure 6:
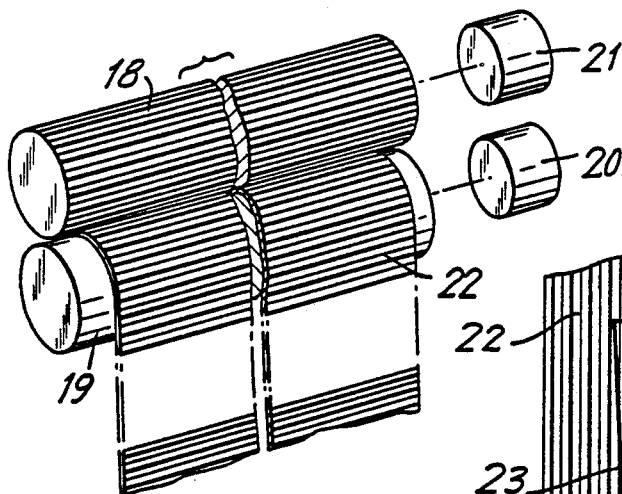
FIG. 6 is an arrangement depicted in partially schematic form of a method for making the ribbed fabric used for making a swimsuit in accordance with the present invention.

The grooves may be created in the plastic film in any number of ways. One preferred method is shown in FIG. 6. A pair of rollers 18 and 19 are arranged to accept the laminated fabric therebetween. The rollers are squeezed together in the manner of a mangle. One of the rollers 18 has inscribed or engraved thereon a plurality of grooves which may be in the direction of travel of the roller or at some angle to it. Both rollers are driven by appropriate and known driving mechanisms 20 and 21. The engraved or inscribed roller is heated, preferably to about 300° F. so that pressure of this roller against the polyurethane film will create ("emboss") the grooves in the film (resulting in grooved fabric 22). Pressure of approximately 40 tons/in$^2$ is appropriate in embossing the grooves in the film. The depth of the grooves in the film is controlled by depth of grooves inscribed in the roller, the pressure between the rollers and the temperature of the heated roller.

Figure 7:
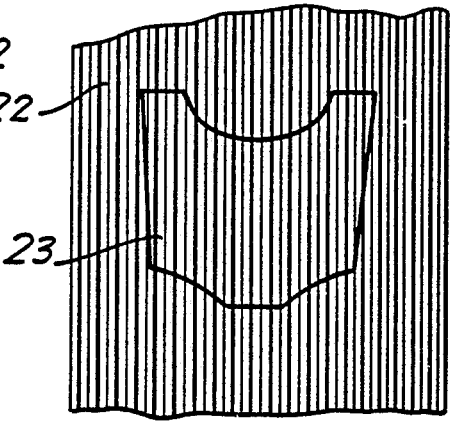
FIG. 7 is a top view of a swimsuit outline superimposed on ribbed fabric produced by the arrangement of FIG. 5.

FIG. 7 illustrates a woman's swimsuit in outline form 23 prior to being cut from the embossed laminated fabric 22 produced by the arrangement of FIG. 5. There, the grooves are aligned with the length (head-to-toe direction) of the fabric. Since the grooves are to be aligned in accordance with the intended use of the fabric, each sport will require groove alignment in accordance with the movement of the fluid flowing past portions of the uniform. It is contemplated, for example, that runners would have grooves in the uniform disposed around the torso to reduce air drag and turbulence.

Grooves may be created in the laminated film without the embossing step referred to above. If the thermoplastic film is bonded to a knitted fabric having ribs which are spaced apart by the dimension A shown in FIG. 2, the very act of bonding will result in peaks and valleys in the bonded film corresponding to the desired grooves. The depth B of these grooves may be somewhat less than the embossed version but will nevertheless be effective in reducing drag upon the athlete.

While the foregoing description and drawings represent the preferred embodiments of the present invention, it will be obvious to those skilled in the art that various changes and modifications may be made therein without departing from the true spirit and scope of the present invention.

What is claimed is:

1. A garment, which, when worn, will reduce drag of a surrounding fluid on a wearer of the garment as the wearer moves through a surrounding fluid, comprising:

a portion to be worn on the body so as to be held closely against the wearer's body, said portion comprising a laminated elastic fabric including:
a stretch fabric layer; and
an elastic, plastic layer bonded to said stretch layer to form a laminate, said plastic layer having a plurality of parallel, spaced grooves disposed in an outer surface thereof, wherein said grooves have a groove-to-groove spacing of from 1/175 inch to 1/225 inch;
said grooves being substantially aligned with the direction of movement of fluid over said portion.

2. The garment of claim 1, wherein said plastic layer is a breathable, waterproof thermoplastic film.

3. The garment of claim 1, wherein said grooves are approximately equally spaced.

4. The garment of claim 1, wherein said grooves are arranged in widely spaced groups of narrowly spaced grooves.

5. The garment of claim 1, wherein said grooves have substantially equal depths.

6. The garment of claim 1, wherein said grooves are embossed in the plastic outer surface.

7. The garment of claim 1, wherein said grooves have a groove-to-groove spacing of approximately 1/200 inch.

8. The garment of claim 5, wherein said grooves have a depth of from 0.3 mil to 0.6 mil.

9. The garment of claim 1, wherein said garment is a swimsuit and the grooves are aligned in the head-to-toe direction of the wearer at least in the front of the swimsuit.

10. The garment of claim 10, wherein said garment has the grooves disposed in an inverted "V" in the rear of the swimsuit.

11. A garment, which, when worn, will reduce drag of a surrounding fluid on a wearer of the garment as the wearer moves through a surrounding fluid, comprising:
a portion to be worn on the body so as to be held closely against the wearer's body, said portion comprising a laminated elastic fabric including:
a stretch fabric layer; and
an elastic, plastic layer bonded to said stretch layer to form a laminate, said plastic layer having a plurality of parallel, spaced grooves disposed in an outer surface thereof, wherein said grooves have a depth of from 0.3 mil to 0.6 mil;
said grooves being substantially aligned with the direction of movement of fluid over said portion.

12. The garment of claim 4, wherein said plastic layer is a breathable, waterproof thermoplastic film.

13. The garment of claim 11, wherein said grooves are approximately equally spaced.

14. The garment of claim 11, wherein said grooves are arranged in widely spaced groups of narrowly spaced grooves.

15. The garment of claim 11, wherein said grooves have substantially equal depths.

16. The garment of claim 11, wherein said grooves are embossed in the plastic outer surface.

17. The garment of claim 11, wherein said grooves have a groove-to-groove spacing of from 1/175 inch to 1/225 inch.

18. The garment of claim 17, wherein said grooves have a groove-to-groove spacing of approximately 1/200 inch.

19. The garment of claim 11, wherein said garment is a swimsuit and the grooves are aligned in the head-to-toe direction of the wearer at least in the front of the swimsuit.

20. The garment of claim 19, wherein said garment has the grooves disposed in an inverted "V" in the rear of the swimsuit.

* * * * *